United States Patent
Ono et al.

(10) Patent No.: US 6,740,709 B2
(45) Date of Patent: May 25, 2004

(54) RESIN MOLDING

(75) Inventors: Satoru Ono, Aichi (JP); Junji Koizumi, Aichi (JP); Kuniyoshi Kondo, Aichi (JP); Michiyoshi Matsumoto, Aichi (JP); Yoshihiro Yamami, Aichi (JP); Setsuo Morizane, Aichi (JP)

(73) Assignees: Toyoda Gosei Co., Ltd., Aichi-ken (JP); Toray Industries Inc., Tokyo (JP)

( * ) Notice: Subject to any disclaimer, the term of this patent is extended or adjusted under 35 U.S.C. 154(b) by 3 days.

(21) Appl. No.: 10/059,262

(22) Filed: Jan. 31, 2002

(65) Prior Publication Data

US 2002/0169237 A1 Nov. 14, 2002

(30) Foreign Application Priority Data

Jan. 31, 2001 (JP) ........................................ 2001-023455

(51) Int. Cl.$^7$ ............................................... C08L 81/04
(52) U.S. Cl. .......................... 525/68; 525/64; 525/150; 525/189; 524/115; 524/323; 524/392
(58) Field of Search ................. 525/64, 68, 150, 525/189; 524/115, 323, 392

(56) References Cited

U.S. PATENT DOCUMENTS

| | | |
|---|---|---|
| 4,514,588 A | 4/1985 | Beever |
| 4,889,893 A | 12/1989 | Kobayashi |
| 5,625,002 A | 4/1997 | Kadoi et al. |

FOREIGN PATENT DOCUMENTS

| | | | |
|---|---|---|---|
| EP | 228 268 | | 7/1987 |
| EP | 302 648 | | 7/1988 |
| EP | 484 273 | | 5/1992 |
| JP | 59-167040 | | 9/1984 |
| JP | 61021156 | | 1/1986 |
| JP | 62-153343 | | 7/1987 |
| JP | 62-153344 | | 7/1987 |
| JP | 1-306467 | | 12/1989 |
| JP | 3-68656 | | 3/1991 |
| JP | 3222722 | | 10/1991 |
| JP | 4159364 | | 6/1992 |
| JP | 4159365 | | 6/1992 |
| JP | 4-170466 | * | 6/1992 |
| JP | 04-170466 | | 6/1992 |
| JP | 6001916 | | 1/1994 |
| JP | 6179791 | | 6/1994 |
| JP | 6299071 | | 10/1994 |
| JP | 8-267585 | | 10/1996 |
| JP | 11100506 | | 4/1999 |
| JP | 11-100506 | * | 4/1999 |
| JP | 11240073 | | 9/1999 |
| JP | 2000198923 | | 7/2000 |
| JP | 2000-309705 | | 11/2000 |
| JP | 2000-309706 | * | 11/2000 |

* cited by examiner

Primary Examiner—Patricia A. Short
(74) Attorney, Agent, or Firm—Posz & Bethards, PLC

(57) ABSTRACT

A resin molding having welding properties, flexibility, and shock impact resistance in a balanced manner. The resin molding has a welded seam, consisting of a resin composition, wherein the resin composition comprises (a) a polyphenylene sulfide resin and (b) an olefin based resin: wherein an amount of the (a) polyphenylene sulfide resin and the (b) olefin based resin is 80 weight % or more of the entire resin composition, and the content of the (b) olefin based resin is 10 to 100 parts by weight relevant to 100 parts by weight of the (a) polyphenylene sulfide resin, and wherein the tensile elongation at break is 20% or more.

6 Claims, 1 Drawing Sheet

RESIN MOLDING

CROSS-REFERENCES TO RELATED APPLICATIONS

The present application claims priority under 35 U.S.C. §119 to Japanese Patent Application No. 2001-023455, filed Jan. 31, 2001, entitled "RESIN MOLDING". The contents of this application are incorporated herein by reference in their entirety.

BACKGROUND OF THE INVENTION

1. Field of the Invention

The present invention relates to a resin molding having a welded seam. More particularly, the present invention relates to a resin molding having welding properties, flexibility, and shock impact resistance in a balanced manner.

2. Discussion of the Background

A polyphenylene sulfide resin (hereinafter, referred to as a PPS resin) has its excellent heat resistance, heat stability, chemical resistance, electrical insulation properties, and humidity and heat resistance or the like. That is because PPS resin is suitable for engineering plastics and used for electric and electronic parts, mechanical parts, and automobile parts or the like.

However, the PPS resin has low flexibility as compared with any other engineering plastics such as nylon and PBT, and poor fusion deposition properties such as strength or expansion hold rate after welded. Therefore the improvement of the PPS resin is strongly expected.

For example, in Japanese Patent Application Laid-open No. 59-167040, there is disclosed a method for adding a hydrogenated SBR copolymer to a PPS resin, thereby improving flexibility of the PPS resin.

In addition, in Japanese Patent Application Laid-open No. 1-306467, Japanese Patent Application Laid-open No. 3-68656, and Japanese Patent Application Laid-open No. 2000-198923, there is disclosed a technique of containing a PPS resin and an olefin based copolymer each having a specific structure at a particular rate, thereby obtaining high flexibility and shock impact resistance.

In the case where a resin container, automobile parts or the like are fabricated from the PPS resin, two molded pieces may be welded on each other, thereby preparing a resin molding. In this case, these resin moldings has been easily broken on a welding interface, and weld properties have been insufficient.

SUMMARY OF THE INVENTION

An object of the present invention is to provide a resin molding having weld properties, flexibility, and shock impact resistance in a balanced manner.

According to one aspect of the present invention, there is provided a resin molding having a welded seam, consisting of a resin composition, wherein the resin composition comprises (a) a polyphenylene sulfide resin and (b) an olefin based resin: wherein an amount of the (a) polyphenylene sulfide resin and the (b) olefin based resin is 80 weight % or more of the entire resin composition, and the content of (b) olefin based resin is 10 to 100 parts by weight relevant to 100 parts by weight of (a) polyphenylene sulfide resin, and wherein the tensile elongation at break is 20% or more.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which.

DESCRIPTION OF THE PREFERRED EMBODIMENTS

Figure 1A:
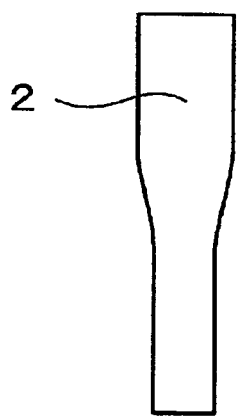
FIG. 1(a) and FIG. 1(b) are illustrative views of a resin molding provided for measuring a tensile elongation of a welded seam at break.

The resin molding according to the present invention is excellent in welding properties such as strength and expansion hold rate after welded, and uniformly excellent in flexibility, shock impact resistance, heat resistance, heat stability, chemical resistance, and oil resistance. By making best use of these characteristics, the above resin molding is suitable for parts each having a welded seam, for example, electric and electronic parts or general equipment, automobile high pressure tanks, structures such as pipes or cases, and metal inserted molding materials.

The tensile elongation at break of the resin molding according to the present invention is 20% or more. The tensile elongation at break of the resin molding used here means the tensile elongation at break of the entire resin molding including a welded seam. This resin molding shows a yielding, and cohesive failure on a welding interface, or fractures at a portion other than the welded seam (ductile fracture).

On the other hand, in the case where the tensile elongation at break and expansion is less than 20%, an interfacial failure may often occur at the welded seam, and ductile fracture hardly occurs.

(1) Polyphenylene Sulfide Resin (PPS Resin)

(a) PPS resin employed for a resin molding according to the present invention is a polymer containing a repeating unit shown by the following structural chemical formula.

[Chemical Formula 1]

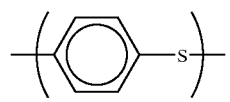

It is preferable that the PPS resin is a polymer, which contains 70 mol % or more, and in particular, 90 mol % or more of the repeating unit from the viewpoint of heat resistance.

The PPS resin can be constituted in repeating unit, less than 30 mol % of which has the following structural chemical formula.

[Chemical formula 2]

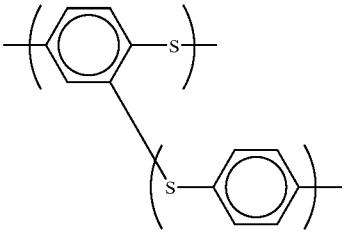

-continued

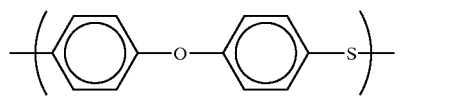
[Chemical formula 3]

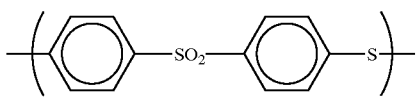
[Chemical formula 4]

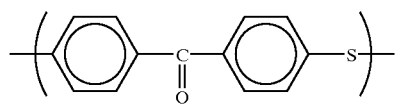
[Chemical formula 5]

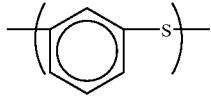
[Chemical formula 6]

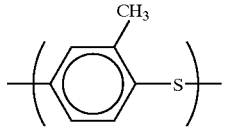
[Chemical formula 7]

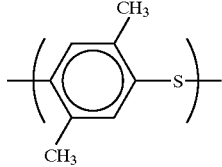
[Chemical formula 8]

The PPS resin includes a polymer having comparatively small molecular weight obtained by a method disclosed in Japanese Patent Application Laid-open No. 45-3368 and a substantially straight chain-shaped polymer having comparatively large molecular weight obtained by a method disclosed in Japanese Patent Application Laid-open No. 52-12240.

The polymer obtained by a method described in Japanese Patent Application Laid-open No. 45-3368 can be employed after highly-polymerized by heating under oxygen environment after polymerization or addition of a crosslinker such as peroxide and heating.

In the present invention, it is possible to employ a PPS resin obtained by any method, but at the same time a substantially straight chain-shaped polymer having comparatively large molecular weight produced by a producing method represented by Japanese Patent Application Laid-open No. 52-12240 described previously is preferably employed for reasons why remarkable advantageous effect of the present invention can be provided and the toughness, flexibility, and shock impact resistance of the PPS resin in itself are excellent.

It is preferable that the PPS resin employed in the present invention is generated through the above polymerization process, followed by i) acid treatment, ii) hot water treatment, or iii) washing in organic solvent.

i) Acid Treatment

Acids employed in acid treatment include acetic acid, hydrochloric acid, sulfuric acid, phosphoric acid, silicic acid, carbonic acid, and propyl acid or the like, which are not limited thereto as long as they do not have action for decomposing the PPS resin. Among them, acetic acid and hydrochloric acid are preferably employed. On the other hand, acids such as nitric acid are not preferable for the reason that they decompose or degrade the PPS resin.

As a method of acid treatment, there is a method for soaking a PPS resin in an acid or acidic solution. It is possible to stir or heat the solution as required. For example, when an acetate is employed, the PPS resin powder is soaked in water solution of pH4 heated at 80 to 90° C., and is stirred for 30 minutes, thereby making it possible to obtain sufficient effect. In order to physically remove the acid or salt that remains in the PPS resin to which acid treatment is applied, it is required to wash the PPS resin with water or warm water several times.

It is preferable that the water employed for washing is distilled water or de-ionized water in order not to lose an effect of preferable chemical modification of the PPS resin caused by acid treatment.

ii) Hot Water Treatment

In hot water treatment of the PPS resin to be used in the present invention, it is important that a temperature of hot water is 100° C. or more, preferably 120° C. or more, further preferably 150° C. or more, or particularly preferably 170° C. or more. At less than 100° C., preferred advantageous effect of chemical modification of the PPS resin is small, which is not preferable.

To develop the preferable advantageous effect of chemical modification of the PPS resin caused by the hot water treatment, it is preferable that distilled water or de-ionized water is used as water. An operation for hot water treatment is carried out by charging a predetermined quantity of PPS resin into a predetermined amount of water, and heating and stirring it in a pressure vessel. At a ratio between the PPS resin and water, water is preferably larger. In general, a ratio of the PPS resin of 200 g or less to 1 l of water is selected.

It is desirable that the environment of hot water treatment is under inactive atmosphere. The reason is that decomposition of a distal end group, which is not preferable, is prevented. It is preferable that after this operation for hot water treatment, the PPS resin is washed several times by hot water to eliminate the residual component.

iii) Washing in Organic Solvent

Organic solvents employed in washing the PPS resin are not particularly limited as long as they do not have action for decomposing the PPS resin. For example, they include: nitrogen-containing polar solvents such as N-methyl pyrrolidone, dimethylformamide, dimetylacetamide, 1,3-dimethyl imidazolidinone, and hexamethyl phosphorous amide, and piperazinone group; sulfoxide or sulfone based solvents such as dimethyl sulfoxide, dimethyl sulfone, and sulfolane; ketone based solvents such as acetone, methyl ethyl ketone, diethyl ketone, and acetophenone; ether based solvents such as dimetyl ether, dipropyl ether, dioxane, and tetrahydofuran; halogen based solvents such as chloroform, methylene chloride, trichloroethylene, ethylene dichloride, perchloroethylene, monochloroethane, dichloroethane, tetrachloroethane, perchloroethane, and chlorobenzene; alcohol phenol based solvents such as methanol, ethanol, propanol, butanol, pentanol, ethylene glycol, propylene glycol, phenol, cresol, polyethylene glycol, and propropylene glycol; and aromatic hydrocarbon based solvents such as benzene, toluen, or xylene.

Amongst these organic solvents, it is particularly preferable to use N-methyl pyrrolidone, acetone, dimethylformamide and chloroform or the like. These organic solvents are used by itself or in mixture of two or more kinds of solvents.

A washing method using organic solvents includes soaking a PPS resin in organic solvents. Stirring or heating can be carried out properly as required.

A washing temperature in washing the PPS resin in organic solvents is not particular limited, and an arbitrary temperature from normal temperature to about 300° C. can be selected. The washing efficiency is prone to increase as the washing temperature is higher. In general, advantageous effect can be sufficiently obtained at the washing temperature of normal temperature to 150° C.

In a pressure vessel, the resin can be washed under pressurization at a temperature above a boiling point of organic solvent. The washing time is not particularly limited. Depending on the washing conditions, in the case of a batch type washing, sufficient advantageous effect is obtained by washing the resin for 5 minutes or more in general. In addition, continuous washing can be carried out as well.

It is sufficient to wash the PPS resin generated by polymerization in organic solvents. It is preferable that water washing or hot water washing is combined with the washing using organic solvents in order to provide more advantageous effect of the present invention. It is preferable to use water soluble organic solvents with high boiling point such as N-methyl pyrrolidone, because the residual organic solvents can be removed easily when the PPS resin is washed with water or hot water after being washed with organic solvents. It is preferable that water employed for these washings is distilled water or de-ionized water.

With respect to the fusion viscosity of the PPS resin employed in the present invention, in order to balance the flexibility and shock impact resistance of the obtained composition in high caliber, it is preferable that a melt flow rate measured according to ASTM-D1238 (a temperature of 315.5° C., and a loading of 49N (5000 g)) is 250 g/10 min or less. In particular, the flow rate of 150 g/10 min or less is employed preferably.

(2) Olefin Based Resin (b) Olefin based resin contained in the resin composition is a polymer in which olefin is (co)polymerized. Examples of the polymer are an olefin based (co)polymer; and an olefin based (co)polymer (modified olefin based (co)polymer) or the like obtained by introducing a monomer component having a functional group (hereinafter, referred to as a functional group-containing component) such as epoxy group, acidic anhydride group, metal complex carboxylate or the like.

One or more kinds of olefin based resins can be used in the present invention.

It is preferable to use together the above modified olefin based (co) polymer and one or more kinds of the other olefin based (co)polymers.

Olefin based (co)polymers include: (co)polymers obtained by polymerizing one or more kinds of a-olefins such as ethylene, propylene, butene-1, pentene-1,4-methyl pentene-1, isobutylene and the like; and a copolymer of α-olefin and α, β-unsaturated carbonic acids such as acrylic acid, methyl acrylate, ethyl acrylate, butyl acrylate, methacrylic acid, methyl methacrylate, ethyl methacrylate, and butyl methacrylate; and α-olefin and alkyl ester of α, β-unsaturated carbonic acids or the like. Preferred specific examples of olefine based (co)polymer include: polyethylene; polypropylene; an ethylene/propylene copolymer; an ethylene/butene-1 copolymer; an ethylene/methyl acrylate copolymer; an ethylene/ethyl acrylate copolymer; a ethylene/butyl acrylate copolymer; an ethylene/methyl methacrylate copolymer; an ethylene/ethyl methacrylate and an ethylene/butyl methacrylate copolymer or the like.

In addition, other copolymerizable unsaturated monomers, for example, vinyl ether, vinyl acetate, vinyl propionate, acrylonitrile, and styrene may be copolymerized with an olefin based copolymer at 40 weight % or less and within the range which does not have negative effects on an object of the present invention.

Examples of functional group-containing components for introducing a monomer component having a functional group such as epoxy group, acidic anhydride group, metal complex carboxylate into the olefin based (co)polymer, include: acidic anhydride group-containing monomers such as maleic anhydride, itaconic anhydride, citraconic anhydride, and endobicyclo-(2,2,1)-5-heptene-2,3-dicarboxylic anhydride; epoxy group-containing monomers such as glycidyl acrylate, glycidyl methacrylate, glycidyl ethacrylate, glycidyl itaconate, and glycidyl citraconate; and monomers containing metal complex carboxylate or the like.

Methods of introducing these functional group-containing components are not particularly limited. And the methods include a method of copolymerization and a method of a graft-introduction using a free-radical initiator for an olefin polymer.

It is proper that a quantity of an introduced functional group-containing monomer component is within the range of 0.001 to 40 mol %, preferably 0.01 to 35 mol % to the entire olefin (co) polymer.

Olefin (co)polymers obtained by introducing a monomer component having a functional group such as epoxy group, acidic anhydride group, metal complex carboxylate into an olefin (co)polymer, which is particularly useful in the present invention, preferably include: an olefin based (co) polymer whose essential copolymerization components are α-olefin and glycidyl ester of α, β-unsaturated carboxylic acid; an olefin based (co)polymer whose essential copolymerization components are α-olefin and acidic anhydride group-containing monomers; and an olefin based copolymer whose essential copolymerization components are a-olefin and metal complex carbonate. In addition, it is possible to further copolymerize these copolymers and α, β-unsaturated carboxylic acid such as acrylic acid, methyl acrylate, ethyl acrylate, butyl acrylate, methacrylic acid, methyl methacrylate, ethyl methacrylate, and butyl methacrylate and alkyl ester of α, β-unsaturated carboxylic acid or the like.

In the present invention, it is preferable to use an olefin based copolymer whose essential components are α-olefin and glycidyl ester of α, β-unsaturated carboxylic acid. In particular, it is more preferable to use an olefin based copolymer whose essential copolymer components are (b) α-olefin of 60 to 99% by weight and glycidyl ester of α, β-unsaturated carboxylic acid of 1 to 40% by weight.

As the above glycidyl ester of α, β-unsaturated carboxylic acid, there can be employed a component shown by the following general formula of chemicals. In the formula, R denotes a hydrogen atom or a lower class alkyl group.

[Chemical formula 9]

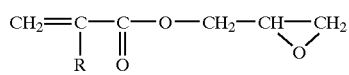

The glycidyl ester of α, β-unsaturated carboxylic acid specifically includes glycidylacrylate, glycidylmethacrylate, and glycidyl ethacrylate or the like. Among them, glycidyl methaclylate is preferably used.

Specific examples of an olefin based copolymer whose essential copolymerization components are α-olefin and glycidyl ester of α, β-unsaturated carbokylic acid include: an ethylene/propylene-g-glycidyl methacrylate copolymer (hereinafter, "g" denotes a graft); an ethylene/butene-1-g- glycidyl methacrylate copolymer; an ethylene/glycidyl acrylate copolymer; an ethylene/glycidyl methacrylate copolimer; an ethylene/methyl acrylate/glycidyl methacrylate copolymer; an ethylene/methyl methacrylate/glycidyl methacrylate copolymer. Among them, an ethylene/glycidyl methacrylate copolymer, an ethylene/methyl acrylate/glycidyl methacrylate copolymer, and an ethylene/methyl methacrylate/glycidyl methacrylate copolymer are preferably employed.

In the resin molding according to the present invention, a total quantity of (a) PPS resin and (b) olefin based resin is required to be 80% by weight or more of the entire resin composition, in order to prevent degradation of high heat resistance, heat stability, and chemical resistance which are inherent to the PPS resin in itself, and it is more preferable that the total quantity is 90% by weight or more.

In addition, the blend rate of the olefin based resin is 10 to 100 parts by weight to 100 parts by weight of the PPS resin. Thus, resin molding having excellent welding properties, flexibility, and shock impact resistance can be obtained. On the other hand, in the case where the olefin based resin is less than 10 parts by weight, the improved advantageous effect of welding properties, flexibility, and shock impact resistance is difficult to be obtained. Conversely, the heat resistance, heat stability, chemical resistance, and oil resistance which are inherent to the PPS resin in itself are degraded, and the viscosity during fusion kneading increases, and a tendency that injection molding properties are degraded occurs in the case where it exceeds 100 parts by weight, which is not preferable.

Preferably, the blend rate of the olefin based resin is 15 to 70 parts by weight relevant to 100 parts by weight of the PPS resin. Thus, flexibility and welding properties can be further improved while keeping characteristics of PPS resin itself.

(3) Others

Further, a resin other than olefin based copolymer can be added to the PPS resin composition according to the present invention in the range that advantageous effect of the present invention may not be derogated. For example, a small amount of thermoplastic resin with its high flexibility is added, thereby making it possible to further improve flexibility and shock impact resistance. However, if this amount is 20% by weight or more of the entire composition, high heat resistance, heat stability, and chemical resistance which are inherent to the PPS resin are degraded, which is not preferable. In particular, addition of 10% by weight or less is preferably used.

Specific examples of the thermoplastic resin include: a polyamide resin; a polybutylene telephthalate resin; a modified polyphenylene ether resin; a polysulfone resin; a polyaryl sulfone resin; polyketone resin; a polyether imide resin; a polyarylate resin; a liquid crystal polymer; a polyether sulfone resin; a polyether ketone resin; a polythioether ketone resin; a polyether ether ketone resin; a polyimide resin; a polyamide imide resin; and a polyethylene tetrafluoride resin or the like. In addition, the following compounds can be added for the purpose of modification. There can be blended: coupling agents such as isocyanate based compound, organic silane based compound, organic titanate based compound, organic boran based component, and epoxy compound; plasticizers such as polyalkylene oxide oligomer based compound, thioether based compound, ester based compound, and organic phosphor based compound; a crystal nucleus agent such as talc, kaoline, organic phosphor compound, and polyether ether ketone; polyolefin such as polyethylene or polypropylene; metal soaps such as wax montanate or analogous, lithium stearate or aluminum stearate; mold release agents such as polycondensate of ethylenediamine, stearic acid, and sebacic acid, or silicon based compound; color protection agents such as hypophosphite, and any other normal additives such as lubricant, ultraviolet inhibitor, coloring agent, flame retardant, and foaming agent. Since the properties inherent to the PPS resin is degraded, it is not preferable that and amount of any of the above compounds exceeds 20% by weight of the entire resin component. Addition of 10% by weight or less is preferable, and 1% by weight or less is further preferable.

The resin component is kneaded by means of a kneading machine or the like. As a typical method of kneading the resin composition by a melt-kneading machine, there is a method wherein the resin composition is supplied to generally well known melt-kneading machines such as a single-shaft or double-shaft extruder, a Banbbarry mixer, a kneader, and a mixing roll and is kneaded at a temperature of 280 to 380° C. In order to control the dispersion mode of an olefin based copolymer as described above, it is preferable that shearing force is comparatively strong. Specifically, it is preferable in a kneading method that a double-shaft extruder is used and the resin temperature during mixing is 320 to 380° C. At this time, the raw material mixing sequence is not particularly limited. The kneading methods include a method of melt-kneading all raw materials using the above method after blending all raw materials; a method of melt-kneading part of the raw materials using the above method after blending the part of the raw materials, and further, melt-kneading after blending the residual raw materials; and a method of blending part of the raw materials, followed by mixing the residual raw material using a side feeder during melt-kneading with the single-shaft or double-shaft extruder. Any of the above methods can be employed. With respect to a small amount of additive component, the other components are kneaded and produced as a pellet by any of the above methods or the like, and thereafter, the component is added prior to molding, and can be subjected to molding.

The resin molding according to the present invention consists of a resin composition in which type and quantity of the above (a) PPS resin and (b) olefin based resin and their compounding conditions are adjusted so as to provide the above physical properties.

The mold pieces obtained by kneading and molding the above resin composition are welded, thereby obtaining a resin molding having its welded seam. The welding methods include, for example, a hot plate welding technique, laser welding technique, and a vibration welding technique.

It is preferable that the above resin composition has 35% or more tensile elongation at break measured in accordance with ASTM-D638 under the condition that the temperature is 23° C. and the relative humidity is 50%.

In this manner, the advantageous effect of the invention can be provided. Moreover the welding properties can be further improved. On the other hand, in the case where the above tensile elongation at break is less than 35%, the fusion welding properties may be degraded.

It is preferable that the resin composition has 500 J/m or more Izod impact strength measured in accordance with ASTM-D256. In this manner, advantageous effect of the invention can be provided. Moreover the shock impact resistance strength is further improved. On the other hand, in the case where the above Izod impact strength is less than 500 J/m, the shock impact resistance strength may be lowered. Here, the above Izod impact strength denotes an Izod impact strength with notch.

It is further preferable that the above resin composition has 35% or more tensile elongation at break and 500 J/m or more Izod impact strength. A resin molding formed of such resin composition has both ductility and strength, and thus, can restricts breakage at a welded seam while the strength at the welded seam is kept to be equal to the strength of any other general part of the resin molding.

It is preferable that the (b) olefin based resin is an olefin based copolymer, wherein a-olefin of 60 to 99% by weight and α, β-unsaturated carboxylic glycidyl ester of 1 to 40% by weight are copolymerized as essential components. In this manner, advantageous effect of the invention can be provided. Moreover, the dispersion properties of the olefin based resin is improved, and sufficient flexibility can be provided. On the other hand, in the case where a-olefin is less than 60% by weight or in the case where α, β-unsaturated carboxylic glycidyl ester exceeds 40% by weight, the resin composition may be gelled at the time of melt-kneading with the PPS resin. In the case where a-olefin exceeds 99% by weight or in the case where α, β-unsaturated carboxylic glycidyl ester is less than 1% by weight, a functional group reacting with the PPS resin is small in amount, and the dispersion properties are poor. Thus, sufficient effect of providing flexibility may not be obtained.

In particular, it is preferable that α-olefin is 97 to 70% by weight, and α, β-unsaturated carboxylic glycidyl ester is 3 to 30% by weight. As a specific example, there is preferably employed a copolymer that contains ethylene/glycidyl methacrylate at a rate of 70 to 97% by weight/3 to 30% by weight.

Specific examples of an olefin based (co)polymer having a monomer that contains α-olefin and an acidic anhydride group as essential copolymerization components include: an ethylene/propylene-g-maleic anhydride copolymer; an ethylene/butene-1-g-maleic anhydride copolymer; an ethylene/methyl acrylate-g-maleic anhydride copolymer; an ethylene/ethyl acrylate-g-maleic anhydride copolymer; an ethylene/methyl methacrylate-g-maleic anhydride copolymer; and an ethylene/ethyl methacrylate-g-anhydrous maleate copolymer. Specific examples of olefin based copolymers having α-olefin and a metal complex carboxylate as essential copolymerization components include: a zinc complex of ethylene/methacrylate copolymer; a magnesium complex of an ethylene/methacrylate copolymer; and a sodium complex of an ethylene/methacrylate copolymer.

In the present invention, as described above, it is preferable to use an olefin based copolymer having α-olefin of 60 to 90% by weight and α, β-unsaturated carboxylic glycidyl ester of 1 to 40% by weight as essential copolymerization components as (b) component. Among them, it is preferable to use together such copolymer and an olefin based (co) polymer that does not have any functional group of, epoxy group, acidic anhydride group, and metal complex carboxylate. For example, an ethylene/butene-1 copolymer and an ethylene/propylene copolymer and the like are preferably employed. Because an olefin based (co)polymer without functional group has high flexibility, it is preferable that the melting flow rate (MFR) is comparatively low. In particular, the rate of 3 g/10 min (ASTM-D1238, 190° C., a loading of 21.18N (2160 g)) or less is preferable.

In addition, it is preferable that when an olefin based (co)polymer having a functional group and an olefin based (co)polymer that does not have any functional group is used together as (b) components, the former is 10 to 40% by weight, and the latter is 90 to 60% by weight relevant to the total of them.

It is preferable that (b) the olefin based resin is dispersed in the resin composition at an average particle diameter of 0.5 micron or less. In this manner, advantageous effect of the invention can be provided. Moreover, the tensile elongation at break and Izod impact strength are further improved and the tensile elongation at break of resin molding is improved.

Further, to improve these physical properties it is preferable that (b) olefin based resin is dispersed in the resin composition at an average particle diameter of 0.3 micron or less.

It is preferable that the resin molding comprises further one or more kinds of oxidization inhibitors selected from among (c) phenol based, thioether based, and phosphor based inhibitors by 0.01 to 5 parts by weight relevant to 100 parts by weight of the (a) polyphenylene sulfide resin. Thus, heat stability during molding and heat stability during welding can be improved and welding properties are improved.

It is preferable that the blend quantity of such oxidization inhibitor is 0.01 parts by weight or more from the viewpoint of effect of improvement of heat resistance. It is preferable that the blend quantity is 5 parts by weight or less from the viewpoint of a gas component generated during molding. In addition, it is preferable to use a phenol based and phosphor based oxidization inhibitors together, because advantageous effects of maintaining heat resistance and heat stability in particular increase.

As the phenol based oxidization inhibitor, a hindered phenol based compound is preferably employed. Specific examples include: triethylene glycol-bis [3-t-butyl-(5-methyl-4-hydroxyphenyl) propionate], N,N'-hexamethylene bis(3,5-di-t-butyl-4-hydroxy-hydrocinnamide), tetrakis [methylen-3-(3',5'-di-t-butyl-4'-hydroxyphenyl) propionate] methane, pentaerythrityl tetrakis[3-(3',5'-di-t-butyl-4'-hydroxyphenyl) propionate], 1,3,5-tris(3,5-di-t-butyl-4-hydroxybenzyl)-s-triazine-2,4, 6-(1H, 3H, 5H)-trion, 1,1,3-tris(2-methyl-4-hydroxy-5-t-butylphenyl) butane, 4,4'-butylidenebis(3-methyl-6-t-buty1phenol), n-octadecyl-3-(3, 5-di-t-butyl-4-hydroxy-phenyl) propionate, 3,9-bis[2-(3-(3-t-butyl-4-hydroxy-5-methylphenyl) propionyloxy)-1,1-dimethylethyl]-2,4,8,10-tetraoxaspiro [5,5] undecane, 1,3,5-trimethyl-2,4, 6-tris-(3,5-di-t-butyl-4-hydroxybenzyl) benzene or the like.

Among them, an ester type polymeric hindered phenol type is preferable. Specifically, there are preferably employed tetrakis [methylene-3-(3',5'-di-t-butyl-4'-hydroxyphenyl) propionate] methane, pentaerithrityltetrakis [3-(3',5'-di-t-butyl-4'-hydroxyphenyl) propionate], 3,9-bis [2-(3-(3-t-butyl-4-hydroxy-5-methylphenyl) propionyloxy)-1,1-dimethylethyl]-2,4,8,10-tetraoxaspiro[5,5] undecane or the like.

Next, the thioether based oxidization inhibitors include: tetrakis [methylene-3-(dodecylthio) propionate] methane, dilauryl-3,3'-thiopropionate, distearyl-3,3'-thiodipropionate or the like.

Next, the phosphor based oxidization inhibitors include: bis(2,6-di-t-butyl-4-methylphenyl) pentaerythrithol-di-phosphite; bis(2,4-di-t-butylphenyl) pentaerythritol-di-phosphite; bis (2,4-di-cumylphenyl) pentaerythritol-di-phosphite; tris(2,4-di-t-butylphenyl) phosphite; tetrakis (2,4-di-t-butylphenyl)-4,4'-bisphenylene phosphite; di-stearyl pentaerythritol-di-phosphite; triphenyl phosphite; and 3,5-di-butyl-4-hydroxy benzyl phosphonate diethyl ester or the like.

Among them, an oxidization inhibitor has preferably high melting point in order to reduce evaporation or decomposition of the oxidization inhibitor. Specifically, there is preferably employed: bis(2,6-di-t-butyl-4-methylphenyl) pentaerythrithol-di-phosphite; bis(2,4-di-t-butylphenyl) pentaerythrithol-di-phosphite; and bis(2,4-di-cumylphenyl) pentaerythrithol-di-phosphite or the like.

Hereinafter, the present invention will be described in more detail by way of Examples. The present invention is not limited to these Examples.

In the following Examples, material properties were measured in accordance with the following method. In addition, an MFR hold rate as an index of heat stability, a flexural modulus at 80° C. as an index of heat resistance, and oil resistance (increment by weight) as an index of chemical resistance were measured in accordance with the following method. Test specimens each employed for these physical properties measurement of materials were prepared by injection molding (cylinder temperature 320° C. and mold temperature 130° C.).

[Average Particle Diameter of Olefin Based Resin]

As a test specimen, an ASTM No. 1 dumbbell specimen was injection-molded in accordance with the above method. Next, a thin piece of 0.1 micron or less was cut from the center of the dumbbell specimen at −20° C. With respect to arbitrary 100 elastomer dispersion portions when observed by a transmission electron microscope, the maximum diameters and minimum diameters of the 100 elastomers each were first measured. Then, the average values of the maximum diameters and minimum diameters of the 100 elastomers each were obtained, and then, an average value of the average values was obtained.

[Tensile Elongation at Break]

The tensile elongation at break was measured in accordance with ASTM-D638.

[Izod Impact Strength]

A test specimen was prepared by injection molding, a notch was provided, and the notched Izod impact strength was measured in accordance with ASTM-D256.

[Flexural modulus at 80° C.]

The flexural modulus was measured at 80° C. in accordance with ASTM-D790.

[MFR Hold Rate, MF60/MF5]

The MFR (MF5) when the retention time is 5 minutes and the MFR (MF60) when the dwell time is 60 minutes were measured respectively at 315.5° C. of measurement temperature and 49N (5000 g) of loading in accordance with ASTM-D1238-86, and a ratio of these (MF60/MF5) were displayed by %. It is low in the case where the viscosity is increased due to such retention. It is 100% or more in the case where the viscosity is lowered.

[Oil Resistance]

As a test specimen, the ASTM No. 1 dumbbell specimen was injection molded in accordance with the above method. Then, the molded piece was soaked in refrigerator oil (JIS 2 type, IS056, available from Nippon Sun Oil, Suniso SG) at 100° C. for 70 hours, a change in weight was measured, and the degree of the increment by weight was displayed by %.

[Tensile Elongation at Break of Resin Molding Having Welded Seam]

Figure 1B:
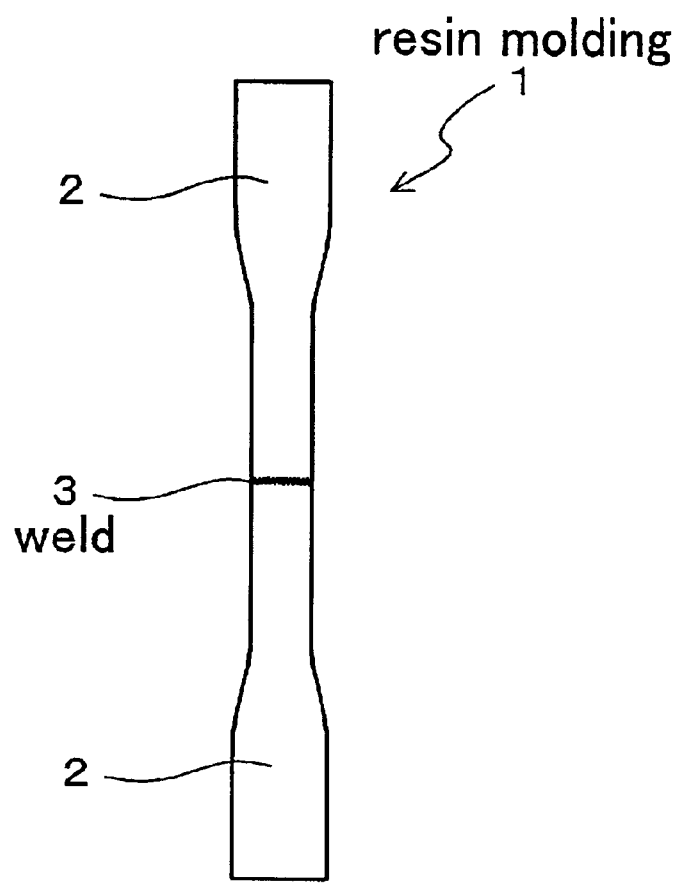

As shown in FIG. 1(a), two molding pieces 2 whose length is ½ of that of ASTM No. 1 dumbbell were molded. As shown in FIG. 1(b), these two molding pieces 2 were welded by a hot plate welding machine (hot plate temperature: 290 to 320° C. and welding time: 30 to 90 seconds) under the atmosphere of room temperature (23° C.), and a resin molding 1 having a welded seam 3 was fabricated. Then, tensile testing was carried out for the resin molding 1 in accordance with ASTM-D638. The tensile velocity when the resin molding 1 was pulled was 5 mm/min.

Two types of PPS resins were prepared in accordance with the following method.

(1) Preparation of PPS-1

A sodium sulfide 9 hydrate of 6.005 kg (25 mol); sodium acetate of 0.656 kg (8 mol); and an N-methyl-2-pyrrolidone (hereinafter, referred to as NMP) of 5 kg were prepared in an autoclave with a stirrer, and were risen in temperature up to 205° C. through nitrogen gradually. Then, water of 3.6 l was exhausted. Next, after cooling a reactor to 180° C., 1,4-dichlorobenzene of 3.727 kg (25.35 mol) and NMP of 3.7 kg were added thereto, sealed under nitrogen, and risen in temperature up to 225° C. After 5-hour reaction, the product was risen up to a temperature of 270° C., and reacted for 3 hours. After cooling, the reacted product was washed with warm water 5 times. Next, the product was charged into NMP of 10 kg heated at 100° C., and were continuously stirred for about 1 hour. Then, the stirred product was filtered, and was washed with hot water several times. This product was charged into ph4 acetic acid water solution of 25 l which was heated at 90° C., and was continuously stirred for about 1 hour. Then, the stirred product was filtered, and was washed with ion exchange water of about 90° C. until pH of the filtrate had been 7. Then, the product was vacuum dried at 80° C. for 24 hours, and PPS-1 of MFR 100 (g/10 min) was obtained.

(2) Preparation of PPS-2

A sodium sulfide 9 hydrate of 6.005 kg (25 mol); sodium acetate of 0.656 kg (8 mol); an N-methyl-2-pyrrolidone (hereinafter, referred to as NMP) of 5 kg were prepared in an autoclave with a stirrer, and risen in temperature up to 205° C. through nitrogen. Then, water of 3.6 l was exhausted. Next, after cooling a reactor to 18° C., 1,4-dichlorobenzene of 3.756 kg (25.55 mol) and NMP of 3.7 kg were added, were sealed under nitrogen, and risen in temperature up to 270° C. Then, the water reacted at 270° C. for 2.5 hours. After cooling, the reacted product was washed with warm water 5 times. Next, the product was charged into NMP of 10 kg heated at 100° C., and was continuously stirred for about 1 hour. Then, the product was filtered, and further, was washed with hot water several times. This product was charged into pH4 acetic acid water solution of 25 l heated at 90° C., and was continuously washed with ion exchange water of about 90° C. until pH of filtrate had been 7. The product was vacuum dried at 80° C. for 24 hours, and PPS-2 of MFR 300 (g/10 min) was obtained.

The MFRs of PPS-1 and PPS-2 were measured in accordance with a method that conforms to ASTM-D1238-86 in which the measurement temperature was 315.5° C., and the loading was 49N (5000 g).

The following 5 kinds of olefin based resins were prepared.

(1) Olefine-1: Copolymer of 8/12% by weight in ethylene/glycidyl methacrylate
(2) Olefin-2: Ethylene/1-butene copolymer Density of 864 Kg/m$^3$, MFR=3.5 g/10 min (a method that conforms to ASTM-D1238 in which the loading is 21.18N (2160 g) and the temperature is 190° C.)
(3) Olefin-3: Ethylene/1-butene copolymer Density of 861 Kg/m$^3$, MFR=0.5 g/10 min (a method that conforms to ASTM-D1238 in which the loading was 21.18N (2160 g) and the temperature was 190° C.)
(4) Olefin-4: Copolymer of 85/15 mol % in ethylene/propylene
(5) Olefin-5: Polyethylene Density of 955 kg/m$^3$ MFR=0.03 to 0.07 g/10 min (a method that conforms to ASTM-D1238 in which the loading is 21.18N (2160 g) and the temperature is 190° C.)

The following oxidization inhibitors were prepared.
(1) Phenol based inhibitor-1: 3,9-bis[2-(3-(3-t-butyl-4-hydroxy-5-methylphenyl) propionyloxy)-1,1-dimethylethyl]-2,4,8,10-tetraoxaspiro[5,5] undecane
(2) Phenol based inhibitor-2: Pentaerithlityltetrakis [3-(3', 5'-di-t-butyl-4'-hydroxyphen yl) propionate]

(3) Phosphor based inhibitor-1: bis(2,4-di-cumylphenyl) pentaerythritol-di-phosphite The crystal nucleus agent were prepared as follows. (1) Crystal nucleus agent: PEEK (polyether ether ketone) Melting viscosity, 0.38 to 0.50 KN s/m$^2$ (AMG/VX/12)

TABLE 1

| | | | Example | | | | | | | | | |
|---|---|---|---|---|---|---|---|---|---|---|---|---|
| | | | 1 | 2 | 3 | 4 | 5 | 6 | 7 | 8 | 9 | 10 |
| PPS resin | PPS-1 | part (s) by weight | 100 | 100 | 100 | 100 | 100 | | | 100 | 100 | 100 |
| | PPS-2 | part (s) by weight | | | | | | 100 | 100 | | | |
| Olefin based resin | Olefin-1 | part (s) by weight | 6 | 9 | 6 | 9 | 12 | 15 | 29 | 25 | 6 | 12 |
| | Olefin-2 | part (s) by weight | | | | | | | | | | |
| | Olefin-3 | part (s) by weight | 12 | 16 | 19 | 16 | 20 | 30 | | 42 | 12 | 20 |
| | Olefin-4 | part (s) by weight | | | | | | | 14 | | | |
| | Olefin-5 | part (s) by weight | | | | | | | | | | |
| | Amount | part (s) by weight | 18 | 25 | 25 | 25 | 32 | 45 | 44 | 67 | 18 | 32 |
| Oxidization inhibitor | Phenol based inhibitor-1 | part (s) by weight | 0.2 | 0.2 | | | 0.4 | 0.3 | | 0.5 | | 0.4 |
| | Phenol based inhibitor-2 | part (s) by weight | | | | 0.3 | | | 2.9 | | | |
| | Phosphor based inhibitor-1 | part (s) by weight | 0.2 | 0.2 | 0.3 | | 0.4 | 0.3 | | 0.5 | | 0.4 |
| Crystal nucleus agent | PEEK | part (s) by weight | 0.05 | 0.05 | 0.05 | | 0.05 | | | | 0.05 | 0.05 |
| Average particle diameter of olefin based copolymer | | μm | 0.2 | 0.2 | 0.2 | 0.6 | 0.2 | 0.2 | 0.3 | 0.3 | 0.2 | 0.2 |
| Tensile elongation at break | | % | 50 | 80 | 80 | 45 | 100 | 65 | 65 | 120 | 50 | 100 |
| Izod impact strength | | J/m | 700 | 730 | 740 | 750 | 720 | 690 | 730 | 700 | 700 | 740 |
| Flexural modulus at 80° C. | | MPa | 1700 | 1400 | 1350 | 1300 | 1100 | 900 | 930 | 750 | 1700 | 1100 |
| MFR hold rate MF60/MF5 | | % | 90 | 85 | 75 | 80 | 90 | 85 | 90 | 75 | 50 | 90 |
| Oil resistance (Degree of increment by weight) | | % | 0.03 | 0.05 | 0.05 | 0.05 | 0.2 | 0.8 | 1.0 | 1.4 | 0.03 | 0.2 |
| Tensile elongation at break of resin molding having weld | | % | 40 | 75 | 40 | 20 | 80 | 45 | 40 | 50 | 30 | 80 |

TABLE 2

| | | | Comparative Example | | | | |
|---|---|---|---|---|---|---|---|
| | | | 1 | 2 | 3 | 4 | 5 |
| PPS resin | PPS-1 | part(s) by weight | 100 | 100 | 100 | | 100 |
| | PPS-2 | part(s) by weight | | | | 100 | |
| Olefin based resin | Olefin-1 | part(s) by weight | | 5 | 6 | 13 | 42 |
| | Olefin-2 | part(s) by weight | | | 12 | 13 | |
| | Olefin-3 | part(s) by weight | | | | | 80 |
| | Olefin-4 | part(s) by weight | | | | | |
| | Olefin-5 | part(s) by weight | | | | 7 | |
| | amount | part(s) by weight | 0 | 5 | 18 | 26 | 122 |
| Oxidization inhibitor | Phenol based inhibitor-1 | part(s) by weight | | | 0.2 | | |
| | Phenol based inhibitor-2 | part(s) by weight | | | | | |
| | Phosphor based inhibitor-1 | part(s) by weight | | | 0.2 | | |
| Crystal nucleus agent | PEEK | part(s) by weight | | | | | |
| Average particle diameter of olefin based copolymer | | μm | — | 0.2 | 0.2 | 0.2 | 0.3 |
| Tensile elongation at break | | % | 6 | 12 | 30 | 20 | 70 |
| Izod impact strength | | J/m | 38 | 60 | 450 | 470 | 650 |
| Flexural modulus at 80° C. | | MPa | 3500 | 2100 | 1600 | 1300 | 500 |
| MFR hold rate MF60/MF5 | | % | 140 | 100 | 45 | 35 | 30 |
| Oil resistance (Degree of increment by weight) | | % | 0 | 0 | 0.02 | 0.05 | 2.8 |
| Tensile elongation at break of resin molding having weld | | % | 2 | 5 | 10 | 10 | 15 |

EXAMPLES 1 TO 10

The above components each were dry blended at a rate shown in Table 1. The olefin based resin was added to 100 parts by weight of the PPS resin in the range of 10 to 100 parts by weight. After dry blending, the resin was melted and kneaded by a double-shaft extruder set at a cylinder temperature in the range of 290 to 320° C. for Examples 1 to 9 and in the range of 200 to 240° C. for Example 10, and the product was produced as a pellet by means of a strand cutter. The resin temperature during melt-kneading was in the range of 345 to 355° C. for Examples 1 to 3 and 5 to 9, in the range of 320 to 323° C. for Example 4 and in the range of 335 to 345° C. for Example 10. The screw rotation velocity of the double-shaft extruder was in the range of 200 to 250 rpm for Examples 1 to 3 and 5 to 9, and was 100 rpm for Example 4 and 200 rpm for Example 10. An extruder die temperature was 310° C. for Examples 1 to 9 and 300° C. for Example 10. Each pellet was dried at 120° C. one night, and then a test specimen was injection molded. Using the above method, the average particle diameter, tensile elongation at break, Izod impact strength, flexural modulus at 80° C., MFR hold rate, and oil resistance of each test specimen was measured. In addition, using a method in the same manner as in the test specimen, two molded pieces were molded and welded, thereby preparing a resin molding having a welded seam, and the tensile elongation at break of this resin molding was evaluated. Table 1 shows the result.

As is evident from the result, in the case where 10 to 100 parts by weight of the olefin based resin was added to 100 parts by weight of the PPS resin (Examples 1 to 10), the resin molding had high tensile elongation at break and Izod impact strength. In addition, the tensile elongation at break of the resin molding having a welded seam was high.

In Examples 2 and 5, in particular, the heat resistance, heat stability, and oil resistance were uniformly excellent, the practicability was very high, and it was found that the resin molding was a material suitable to use of a structure or the like.

In the case where the average particle diameter of the olefin based resin was 0.5 micron or less (Examples 1 to 3 and 5 to 10), it was found that the tensile elongation at break of the olefin based resin and that of the resin molding having a welded seam were further excellent as compared with a case where the average particle diameter was 0.6 micron (Example 4). The hod impact strength, the flexural modulus, MFR hold rate, and oil resistance that are other physical properties were satisfactory in Example 4 as in any other example.

COMPARATIVE EXAMPLES 1 AND 2

With respect to PPS-1 only or addition of an olefin based resin and an oxidization inhibitor of less than 10 parts by weight to PPS-1, pelletization and evaluation were carried out in the same manner as in Example 1, and the result was shown in Table 2. The tensile elongation at break of the resin molding having a welded seam, and tensile elongation at break and Izod impact strength of the resin molding were low, and it was found that the material has inferior flexibility or shock impact resistance.

COMPARATIVE EXAMPLES 3 AND 4

Pelletization and evaluation were carried out in the same manner as in Example 1 by using an olefin based resin that does not have a functional group of MFR 3.5 g/10 min without using an oxidization inhibitor, and the result was shown in Table 2. The tensile elongation at break of the resin molding having the welded seam was as low as less than 20%. In addition, the tensile elongation at break and Izod impact strength were low, and it was found that the material has inferior flexibility and shock impact resistance, In addition, it was found that the material has low MFR hold rate and inferior heat stability.

COMPARATIVE EXAMPLE 5

Pelletization and evaluation were carried out in the same manner as in Example 1 by employing a resin composition consisting of PPS resin and olefin based resin that exceeds 100 parts by weight relevant to 100 parts by weight of the PPS resin, and the result was shown in Table 2.

As a result, although the tensile elongation at break and Izod impact strength were great, the tensile elongation at break of the resin molding having a welded seam was as low as 15%, and the heat resistance and oil resistance inherent to the PPS resin itself were lowered. The MFR hold rate was also small.

Obviously, numerous modifications and variations of the present invention are possible in light of the above teachings. It is therefore to be understood that, within the scope of the appended claims, the invention may be practiced otherwise than as specifically described here.

What is claimed is:

1. A resin molding, comprising:
   a welded seam made by hot welding and including a plurality of mold pieces formed from a resin composition,
   wherein the resin composition comprises (a) a polyphenylene sulfide resin and (b) an olefin based resin, wherein an amount of the (a) polyphenylene sulfide rosin and the (b) olefin based resin is 80 weight % or more of the entire resin composition, and the content of the (b) olefin based resin is 10 to 100 parts by weight relevant to 100 parts by weight of the (a) polyphenylene sulfide resin,
   wherein the resin composition further comprises at least one from the group selected from (c) one or more kinds of oxidization inhibitors selected from among phenol based, thioether based, and phosphor based inhibitors by 0.01 to 5 parts by weight of the (a) polyphenylene sulfide resin and (d) a polyether ether ketone which is less than or equal 10% and greater than 0% by weight of based on whole composition, and
   wherein the tensile elongation at break is 20% or more.

2. A ream molding as claimed in claim 1, wherein the resin composition has 35% or more tensile elongation at break measured in accordance with ASTM-D638 under the condition that a temperature is 23° C. and a relative humidity is 50%.

3. A resin molding as claimed in claim 1, wherein the resin composition has 500 J/m or more Izod impact strength measured 20 in accordance with ASTM-D256.

4. A resin molding as claimed in claim 1, wherein the (b) olefin based resin is an olefin based copolymer, wherein a-olefin of 60 to 99% by weight and a, (3-unsaturated carboxylic glycidyl ester of 1 to 40% by weight are copolymerized as essential 25 components.

5. A ream molding as claimed in claim 1, wherein the (b) olefin based resin is dispersed in the resin composition at an average particle diameter of 0.5 micron or less.

6. A resin molding as claimed in claim 1, wherein the (b) olefin based resin comprises olefin based (co)polymer having a functional group selected from a group including epoxy group, acidic anhydride group and metal complex carboxylate, and one or more kinds of the other olefin based (co)polymers.

* * * * *